US000001857H

United States Statutory Invention Registration [19]

[11] Reg. Number: H1,857

Germinario et al.

[45] Published: Sep. 5, 2000

[54] METHOD FOR REDUCING PEEL DEFECTS IN ADHESIVE BONDED PLASTICS

[75] Inventors: Louis T. Germinario, Kingsport, Tenn.; James A. Wrycha, Menasha, Wis.

[73] Assignee: Eastman Chemical Company, Kingsport, Tenn.

[21] Appl. No.: 08/767,895

[22] Filed: Dec. 17, 1996

Related U.S. Application Data

[60] Provisional application No. 60/009,044, Dec. 21, 1995.

[51] Int. Cl.[7] ..... B27B 17/00

[52] U.S. Cl. ..... 264/130; 264/134

[58] Field of Search ..... 264/466, 130, 264/210.1, 210.2

[56] References Cited

U.S. PATENT DOCUMENTS

| | | | |
|---|---|---|---|
| 3,499,791 | 3/1970 | Maloney | 117/232 |
| 3,619,615 | 11/1971 | Fish | 250/106 |
| 3,647,592 | 3/1972 | Woodberry | 156/285 |

(List continued on next page.)

FOREIGN PATENT DOCUMENTS 0 349 009 A 1/1990 European Pat. Off. .

OTHER PUBLICATIONS

Wettermann, Static control methods in hazardous areas in converting operations, Tappi Journal, vol. 78, No. 2, pp. 192–199 (1995).

Owens, Spark ignition hazards caused by charge induction, Plant/Operations Progress, vol.7, No. 1, pp. 37–39 (1988).

Dissado et al., Electrical degradation and breakdown in polymers, Peter Peregrinus Ltd., pp. 56–67.

ESCIS, Static electricity: rules for plant safety, Plant/Operations Progress, vol.7, No. 1, pp. 1–22 (1988).

Shelton, Effects, theory and control of static electricity, Best's Safety Directory, 22 ed. (1982).

Antonevich et al., Measuring effectiveness of air ionizers, Simco publication number 5200135 Simco brochure.

(List continued on next page.)

*Primary Examiner*—Harold J. Tudor

*Attorney, Agent, or Firm*—Cheryl J. Tubach; Harry J. Gwinnell

[57] ABSTRACT

A method for producing a processed polymeric sheet to be adhesively secured to a cover to form a seal, the sheet having properties such that the seal does not have branching peel defects when it is separated. A polymeric sheet is formed from a source of polymeric material, and at least one side of the polymeric sheet is coated with silicone. The polymeric sheet is further processed while implementing a static neutralization method to substantially eliminate electrostatic discharge across the polymeric sheet during such further fabrication, producing a processed polymeric sheet. Preferably the polymeric material is selected from the group consisting of polyethylene, polystyrene, polyester, polyvinyl chloride, polypropylene, acrylics, acrylonitrile, polycarbonates, polyimide, and cellulosics. The static neutralization method, in different preferred embodiments, may be impregnating the polymeric source with a conductive material to dissipate a static charge on the polymeric sheet, coating the polymeric sheet with a hygroscopic material to attract moisture and dissipate a static charge on the polymeric sheet, at least partially ionizing an air mass and passing the polymeric sheet through the air mass to neutralize a static charge on the polymeric sheet, or passing the polymeric sheet near static neutralization bars to neutralize a static charge on the polymeric sheet.

8 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

U.S. PATENT DOCUMENTS

| | | | |
|---|---|---|---|
| 3,823,061 | 7/1974 | Frayer et al. | 161/254 |
| 4,072,769 | 2/1978 | Lidel | 427/38 |
| 4,371,489 | 2/1983 | McGrail | 264/210.1 |
| 4,478,873 | 10/1984 | Masso et al. . | |
| 4,875,581 | 10/1989 | Ray et al. | 206/328 |
| 4,900,388 | 2/1990 | Wyslotsky | 156/272.6 |
| 5,008,968 | 4/1991 | Preston | 15/1.51 |
| 5,094,790 | 3/1992 | Halter | 264/210.1 |
| 5,211,899 | 5/1993 | Fujii | 264/210.2 |
| 5,215,636 | 6/1993 | Danilychev et al. | 204/164 |
| 5,245,503 | 9/1993 | Rodrigo | 361/231 |
| 5,342,684 | 8/1994 | Carespodi . | |
| 5,501,899 | 3/1996 | Larkin | 428/288 |
| 5,674,442 | 10/1997 | Morita | 264/210.2 |

OTHER PUBLICATIONS

Shelton, Eliminating static electricity from plastic parts, Society of Manufacturing Engineers conference, Sep. 22–24, Technical paper number FC87–612 (1987).

LaVielle et al., Influence of an electric field on polar–group orientation and adhesion at poly(ethylene terephthalate) surfaces, Journal of Applied Polymer Science, vol. 46, pp. 1045–1050 (1992).

Yasuda et al., *Polymer Surfaces and Interfaces*, John Wiley & Sons Ltd., Ch. 8. pp. 149–163 (1987).

Armouroux et al., J Polymer Science, Polymer Chemistry ed., vol. 19, pp. 1373–1387 (1982).

Briggs et al., Polymer, vol. 21, Aug., pp. 895–900 (1980).

Packman (editor), *Handbook of Adhesion*, John Wiley and Sons, Inc. New York, pp. 94–95 (1992).

METHOD FOR REDUCING PEEL DEFECTS IN ADHESIVE BONDED PLASTICS

CROSS REFERENCE TO RELATED APPLICATION

This application claims the benefit of provisional application Ser. No. 60/009,044, filed Dec. 21, 1995.

FIELD OF THE INVENTION

This invention relates to the field of bonding plastics with adhesives. More particularly the invention relates to the field of bonded plastic packaging for sterile items.

BACKGROUND OF THE INVENTION

Many industries, such as the pharmaceutical and medical packaging industries, require aseptic packaging of items that must remain sterile for as long as they are packaged. Therefore, the ability of the package material to act as an adequate bacterial (and other infectious organism) barrier, and the ability of the package seal to remain intact and continuous are important considerations.

The sterility of a package is typically evaluated by the medical professional prior to use by visual inspection of the package surfaces and the peeled sealing surfaces after the package is opened. A puncture in the package or a non-uniform peeled sealing surface indicates that the package contents may not be sterile and should be discarded. A uniform frosty appearance of the peeled sealing surfaces generally indicates a good seal.

The frosty appearance is typically the result of the adhesive, which is used to bond the packaging materials together, being left on both of the sealing surfaces after peeling. When the adhesive is left on both of the sealing surfaces in this manner, a cohesive separation has occurred within the adhesive layer during peeling. Alternately, an adhesive failure may occur between the adhesive and one of the sealing surfaces. When there is an adhesive failure, one of the peeled sealing surfaces has the frosty appearance of the adhesive, and the other sealing surface has the smooth appearance of the bare packaging material.

Thus, when the frosty appearance of a cohesive separation is observed, the person opening the package is assured that the adhesive seal was continuous and adequately bonded to both of the sealing surfaces. This provides confidence that the item within the package is still sterile. However, when the smooth appearance of an adhesive failure is observed, the person opening the package does not know whether the seal was good and that an adhesive failure occurred during peeling, or that the seal was bad and that an adhesive failure occurred prior to peeling the package open. If an adhesive failure occurred prior to peeling, then the package contents may not be sterile. Because it is typically not a simple matter to conclusively determine whether the adhesive failure occurred before or during peeling, it is most prudent to assume that the adhesive failure occurred prior to peeling, and discard the contents. This, of course, increases the cost associated with the use of the sterile items.

One type of adhesive peel defect is typically called "branching," or "channeling." The defect is called branching because there are smooth adhesive failure areas surrounded by frosty cohesive separation areas within the peeled areas. The smooth adhesive failure areas look like the branches of a tree. If the branches of the adhesive failure areas connect from the outside of the seal area to the inside of the seal area, then a channel has been formed through the seal. A single path of adhesive failure may be termed a channel defect. As used herein, "branching" refers to both branching and channeling type defects.

Branching defects have been observed on packaging made from a polyester of terephthalic acid, ethylene glycol, and 1,4-cyclohexanedimethanol (PETG), that has been coated on at least one side with silicone. Branching peel defects are not typically found on packages made from PETG that has not been coated with silicone. The silicone coating is useful as an anti-nesting agent, or in other words to keep stacked pieces of the PETG from sticking to each other. Therefore, it is desirable to continue using the silicone coating.

Contamination on the surface of the packaging material tends to create a defect that looks like branching, but which is actually quite different. Surface contamination inhibits a proper seal from ever forming between the adhesive and the surface of the package material. Thus, with surface contamination, a proper seal is typically never formed. By distinction, a branch defect looks like there may have been a gap between the adhesive and the packaging material, but in reality there was a good adhesive seal.

It has been thought that adhesive peel defects such as branching could be eliminated by increasing the adhesion between the PETG packaging and the adhesive. An electrostatic or corona discharge applied over a polymeric surface tends to oxidize the polymer surface, increasing the surface energy and polarity, and promoting adhesion to the polymer surface. Therefore, attempts have been made to treat packaging materials for sterile items with an electrostatic discharge, in an effort to eliminate branching peel defects. However, such treatment has typically not reduced branching peel defects effectively.

What is needed, therefore, is a method for achieving reduced branching peel defects in adhesive bonded plastics.

SUMMARY OF THE INVENTION

The above and other needs are provided by a method for producing a processed polymeric sheet to be adhesively secured to a cover to form a seal, the sheet having properties such that the seal does not have branching peel defects when it is separated. A polymeric sheet is formed from a source of polymeric material, and at least one side of the polymeric sheet is coated with silicone. The polymeric sheet is further processed while implementing a static neutralization method to substantially eliminate electrostatic discharge across the polymeric sheet during such further fabrication, producing a processed polymeric sheet.

Preferably the polymeric material is selected from the group consisting of polyethylene, polystyrene, polyester, polyvinyl chloride, polypropylene, acrylics, acrylonitrile, polycarbonates, polyimide, and cellulosics. The static neutralization method, in different preferred embodiments, may be impregnating the polymeric source with a conductive material to dissipate a static charge on the polymeric sheet, coating the polymeric sheet with a hygroscopic material to attract moisture and dissipate a static charge on the polymeric sheet, at least partially ionizing an air mass and passing the polymeric sheet through the air mass to neutralize a static charge on the polymeric sheet, or passing the polymeric sheet near static neutralization bars to neutralize a static charge on the polymeric sheet.

The above method may be used for packaging a sterile item into a package having an adhesive seal, which, when opened, does not have branching peel defects in the adhesive seal. A polymeric material is formed into a polymeric sheet, and at least one side of the polymeric sheet is coated with silicone. A static neutralization method is implemented to substantially eliminate electrostatic discharge across the polymeric sheet. The polymeric sheet is formed into a polymeric receptacle, and the sterile item is placed within the polymeric receptacle, and a cover is attached to the polymeric receptacle by means of the adhesive, thereby forming a seal which does not have branching peel defects when opened.

BRIEF DESCRIPTION OF THE DRAWINGS

Further advantages of the invention will become apparent by reference to the detailed description of preferred embodiments when considered in conjunction with the following drawings, which are not to scale, in which like reference numerals denote like elements throughout the several views, and wherein.

DETAILED DESCRIPTION OF THE INVENTION

Figure 1:
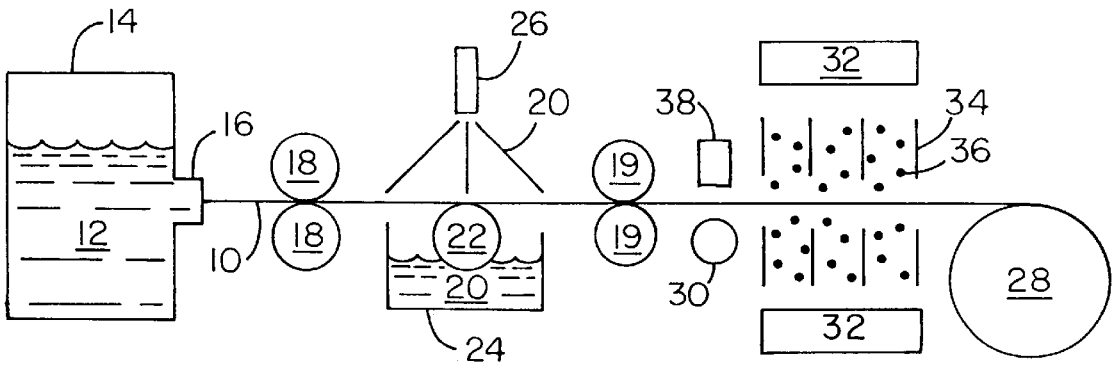
FIG. 1 is a functional diagram of the fabrication process.

Referring now to the drawings, there is depicted in FIG. 1 a functional diagram of the fabrication process for a polymer sheet 10. The polymer sheet 10 is initially produced with an extruder 14 that either melts or softens a source 12 of the polymer, which is then extruded through a nozzle 16. In a preferred embodiment, the polymeric material used to form the sheet 10 is selected from the group consisting of polyethylene, polystyrene, polyester, polyvinyl chloride, polypropylene, acrylics, acrylonitrile, polycarbonates, polyimide, and cellulosics. Most preferably a polyester of terephthalic acid, ethylene glycol and 1,4-cyclohexanedimethanol (PETG) is used. This is commonly termed a glycol modified polyester, such as EASTAR PETG Copolyester 6763 manufactured by Eastman Chemical Company of Kingsport, Tenn.

The sheet 10 is drawn through a first series of rollers 18. It will be appreciated that the rollers 18 as depicted are representative only. While the rollers 18 are depicted as a single pair, in actual use the rollers 18 may be used in pairs or individually, and in other ways well known in the art. Additionally, there will typically be more than just the single set of rollers 18 that are depicted. Therefore, it should be understood that rollers 18 diagrammatically represent any number and combination of rollers. Finally, the sheet 10 as depicted traverses a flat path, but this has only been done so as to not unduly complicate the drawing, or draw attention away from the more important aspects of the invention. In actual implementation, the sheet 10 would probably follow a non-planar path from one end of the fabrication process to the other. The rollers 18 help shape the physical characteristics of the sheet 10, such as the thickness, surface texture, and width. The sheet 10 is preferably between about 5 mils and about 60 mils thick.

The sheet 10 is coated on at least one side with a silicone coating 20. The silicone 20 is preferably a poly(dimethyl siloxane) such as SM 2128 Silicone Emulsion manufactured by General Electric Company, Waterford, N.Y., or most preferably DC 365 Silicone Emulsion, manufactured by Dow Corning of Midland, Mich. The silicone 20 is useful as a de-nesting agent, to inhibit items made from the sheet 10 from sticking to one another when they are stacked together.

The silicone 20 may be applied by any one or more of a variety of methods. For example, the silicone 20 may be roll coated onto the sheet 10 by means of a roller 22 which contacts the silicone 20 in a reservoir 24 at one portion of the roller 22, and then rotates to dispense some of the silicone 20 onto the sheet 10 at another portion of the roller 22. Alternately, the silicone 20 may be sprayed onto the sheet 10, such as from a nozzle 26. While FIG. 1 depicts both sides of the sheet 10 being coated with silicone 20, using a different method to coat each side, it will be appreciated that only one side of the sheet 10 needs to be coated, and that any single method, or combination of methods may be used.

The sheet 10 will typically be drawn through a second set of rollers 19. As described above, even though a single set of rollers 19 has been depicted, it will be appreciated that the rollers 19 may be used singularly or in sets or two or more, and there will typically be more than a single set. The sheet 10 is typically wound onto a wind-up roll 28 for staging prior to sale or further fabrication. Alternately, the sheet 10 could immediately be further processed.

At various points in the fabrication process of the sheet 10, there is an opportunity for a static charge to develop on the sheet 10. Commonly, the charge is developed at the rollers 18 and 19, and the wind-up roll 28. If a sufficient charge accumulates, then an electrostatic discharge will occur. Such a discharge, if sufficiently great, can ignite a combustible atmosphere, start a fire, or harm personnel.

As used herein, "electrostatic discharge," or just "discharge," refers to a localized accumulated charge that is reduced by one or more methods which are commonly called a "shock," and which include, without limitation, spark discharge, brush discharge, corona discharge, Lichtenberg discharge, and lightening-like discharge. Such discharges typically result in a luminous phenomenon, commonly called a spark.

Figure 2:
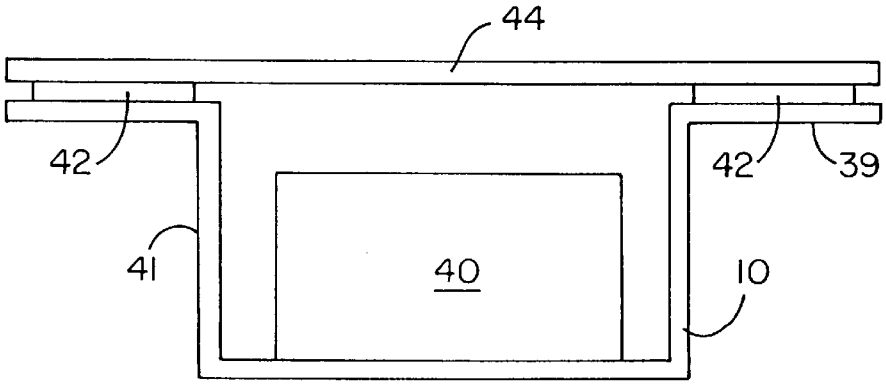
FIG. 2 is a cross-sectional view of a packaged sterile item.

There is depicted in FIG. 2 a packaged sterile item 40. The package for the sterile item 40 is produced by fabricating the sheet 10 as described above, and then forming it into a receptacle 41. The receptacle 41 may be formed by any one of a number of different methods well known in the art, such as thermoforming. The sterile item 40 is placed within the receptacle 41.

A cover 44 is placed on the receptacle 41, and is attached to the receptacle 41 by means of an adhesive 42. The adhesive 42 is applied to at least portions of the cover 44. The adhesive 42 is preferably a hot melt type adhesive, such as an ethylene vinyl acetate (EVA) rich copolymer adhesive. While the cover 44 may be fashioned from a variety of different materials, in the preferred embodiment a spun bonded polyolefin is used, such as TYVEK. The cover 44 is preferably not applied to the side 39 of the sheet 10 to which the silicone 20 was applied, if only one side of the sheet 10 was coated.

The process of forming the package for the sterile item 40 as described above specified an order of first forming the receptacle 41, then placing the sterile item 40 within the receptacle 41, then applying the adhesive 42 to the cover 44, which is then attached to the receptacle 41. It will be appreciated that this specified order is for illustration only, and that in actual implementation, any one of a number of different process orders may be employed without departing from the spirit of the invention. For example, the receptacle 41 may be formed and the sterile item 40 placed within it, the adhesive 42 may then be placed on the receptacle 41, which is then attached to the cover 44.

In a preferred embodiment, the entire package and its contents (sterile item 40) are sterilized after the package has been completely assembled. A method such as ethylene oxide (ETO) sterilization or gamma irradiation may be used to sterilize the package and contents. In alternate embodiments the components of the package are sterilized individually and then assembled. Other methods of sterilization may be used in alternate embodiments.

As previously described, when the sterile item 40 is removed from the package, by removing the cover 44 from the receptacle 41, the adhesive 42 is inspected to see that a portion of it remains on all the sealing surfaces of both the cover 44 and the receptacle 41. If the adhesive 42 is not visible on all surfaces, then it is prudent to assume that the item 40 is no longer sterile, and to discard it in favor of another.

Figure 3:
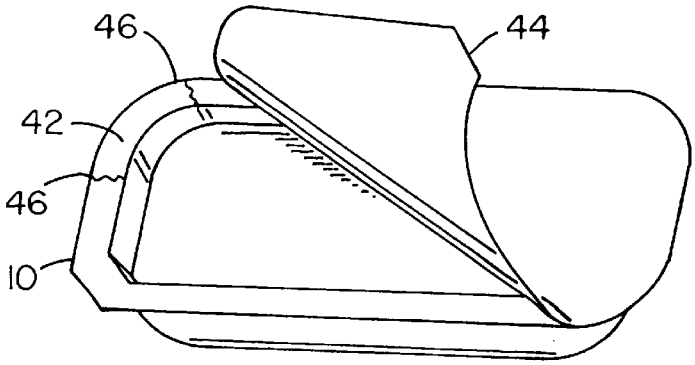
FIG. 3 is a partial view of a peeled sealing surface having branching peel defects.

FIG. 3 depicts, in representative fashion, branching peel defects 46, such as may be seen in the adhesive 42 on the sheet 10 which forms the receptacle 41. As can be seen, there are branches 46 in the adhesive 42. The branches 46 are areas where the adhesive 42 did not adhere to sheet 10 as the cover 44 was peeled away. Instead, as the cover 44 was peeled away, all of the adhesive 42 stuck to the cover 44, and was removed with the cover 44. In the other areas, a portion of the adhesive 42 was removed with the cover 44, and a portion of the adhesive 42 remained on the sheet 10. As previously mentioned, this latter separation mode, cohesive separation, is the generally desired separation mode for peeling.

The branches 46 tend to indicate that an adhesive failure occurred in these areas before a cohesive separation could occur. In other words, the adhesion between the adhesive 42 and the sheet 10 was less than the cohesion within the adhesive 42. Using an adhesive 42 which is less cohesive is generally not a desired solution to the problem, as it would allow for the cover 44 to be too easily inadvertently removed from the receptacle 41. Thus, a method for enhancing the surface of the sheet 10 to which the adhesive 42 is applied is desired.

As previously described, it is generally known to those skilled in the art that applying an electrostatic discharge to the sheet 10 during fabrication typically enhances the adhesive nature of the surface of the sheet 10. Thus, the natural occurrence of electrostatic discharge during processing, as described above, would typically be thought of as beneficial to the bonding characteristics of sheet 10. However, even intentionally employing electrostatic discharge, such as corona discharge, to the sheet 10 used to form receptacles 41 does not tend to reduce the incidence of branching peel defects 46.

It has been discovered that, contrary to the conventional wisdom described above, eliminating any type of electrostatic discharge from occurring across the sheet 10 tends to reduce the frequency and degree of branching peel defects 46 in sterile packages made in this manner. Thus, the present invention goes against the common teaching of using corona discharge to increase adhesion, and further, displays the importance of reducing electrostatic discharge during the fabrication process of the sheet 10, and not just those points at which explosion, fire, or harm to personnel could result. Indeed, one aspect of the invention is that the electrostatic discharge from the sheet 10 is not just detrimental to the environment in which the sheet 10 is produced, but to the sheet 10 itself.

Thus, to reduce branching peel defects 46 in these packages, an electrostatic discharge must be prevented from occurring after the time that the silicone 20 is applied to the sheet 10. It does not appear to be important, from the standpoint of reducing branching peel defects 46, to eliminate or reduce electrostatic discharge across the sheet 10 prior to applying the silicone 20 coating.

Any one of a number of different methods may be used to control electrostatic discharge across the sheet 10. These methods are called neutralization, and they differ from electrostatic discharge in many important respects. One important difference is that neutralization tends to not be accompanied by the luminous phenomena, or spark, that is attendant with electrostatic discharge. Neutralization methods typically fall into one of two categories, conductivity or replacement.

To implement a conductivity method, for example, the sheet 10 may be impregnated with a conductive material, by incorporating the conductive material within the melt 12. In this manner, static charges will tend to not accumulate on the sheet 10, but will be conducted away by the conductive nature of the sheet 10. Alternately, the surface of the sheet 10 may be treated with a hygroscopic material, such as by incorporating the hygroscopic material within the silicone 20 that is coated onto the surface of the sheet 10. The hygroscopic material attracts moisture from the air to the surface of the sheet 10. The moisture at the surface of the sheet 10 increases the conductivity of the sheet 10, again allowing the static charge to be conducted away, rather than building up until an electrostatic discharge occurs.

Other neutralization methods of static control that may be employed do not involve changing the physical properties of the sheet 10 itself. The preferred embodiment implements one or more replacement methods, including a static bar 30, which typically consists of a straight row of ionizing points contained in a metal casing. The sheet 10 may pass within an inch of the bar 30, but preferably does not contact the bar 30. Another preferred method is to use blowers 32 to blow air through a grid of ionizing points 34, which create positive and negative ions 36 in the air. The ions 36 neutralize the static charges on the sheet 10. Any one of a number of other neutralization methods may also be used.

The charge on the sheet 10 may be monitored at one or more locations throughout the fabrication process, such as by process monitor 38. By reading the degree of static charge at different locations, additional antistatic procedures can be automatically implemented at times when the static charge on the sheet 10 generally increases, or in specific areas of the fabrication process where the charge is accumulating. By implementing neutralization methods to keep the surface voltage of the sheet 10 generally below about 3,000 volts, the probability of electrostatic discharge is substantially reduced, and with it the probability of branching peel defects 46 occurring.

While specific embodiments of the invention have been described with particularity above, it will be appreciated that the invention is equally applicable to numberless processes well known to those skilled in the art.

What is claimed is:

1. A method for producing a processed polymeric sheet to be adhesively secured to a surface to form a seal, comprising:

forming a polymeric sheet from a source of polymeric material, coating at least one side of the polymeric sheet with silicone, and thereafter processing the polymeric sheet while implementing a static neutralization method at a source of electrostatic charge accumulation to prevent an electrostatic charge accumulation of greater than 3000 volts across the polymeric sheet during processing, thereby producing a processed polymeric sheet that is resistant to peel defects when the processed polymeric sheet is adhesively secured to a surface and then peeled from the surface;

whereby the processed polymeric sheet is resistant to peel defects by the prevention of the electrostatic charge accumulation at the source of accumulation during processing.

2. The method of claim 1 wherein implementing the static neutralization method comprises impregnating the source of polymeric material with a sufficient quantity of conductive material to prevent electrostatic accumulation of greater than 3000 volts on the polymeric sheet.

3. The method of claim 1 wherein implementing the static neutralization method comprises coating the polymeric sheet with a sufficient quantity of hygroscopic material to attract moisture and prevent electrostatic accumulation of greater than 3000 volts on the polymeric sheet.

4. The method of claim 1 wherein implementing the static neutralization method comprises at least partially ionizing an air mass and passing the polymeric sheet through the air mass whereby electrostatic charge accumulation across the polymeric sheet is neutralized at the source of accumulation.

5. The method of claim 1 wherein implementing the static neutralization method comprises passing the polymeric sheet near static neutralization bars to prevent electrostatic accumulation of greater than 3000 volts on the polymeric sheet.

6. A method for producing a processed polymeric sheet to be adhesively secured to a cover to form a seal, the processed polymeric sheet having properties such that the seal is resistant to branching peel defects when the seal is separated, comprising:

extruding glycol modified polyester from a source of glycol modified polyester to produce a polymeric sheet, coating one side of the polymeric sheet with silicone, and thereafter passing the polymeric sheet through an at least partially ionized air mass at a source of electrostatic charge accumulation of the polymeric sheet to prevent an electrostatic charge accumulation of greater than 3000 volts on the polymeric sheet; whereby a processed polymeric sheet, having electrostatic charge accumulation of below about 3000 volts after application of silicone, is produced that has a seal resistant to branching peel defects when the processed polymeric sheet is adhesively secured to a cover and then peeled from the cover.

7. A method for fabricating packaging material for sterile items, the packaging material having a reduced number of branching peel defects, comprising the steps of:

(a) extruding a polymeric sheet, (b) drawing the polymeric sheet through a first series of rollers, the first series of rollers acting to set physical characteristics of the polymeric sheet, (c) coating at least one side of the polymeric sheet with silicone, (d) drawing the coated polymeric sheet through a second series of rollers, (e) winding the polymeric sheet onto a spool, and (f) implementing a static neutralization method at steps (d) and (e) to prevent an electrostatic charge accumulation of greater than 3000 volts across the polymeric sheet by neutralizing any charge accumulation occurring at contact between the coated polymeric sheet and the second series of rollers and between the coated polymeric sheet and the spool.

8. A method for fabricating packaging material for sterile items, the packaging material having no branching peel defects, comprising the steps of:

(a) extruding glycol modified polyester into a polymeric sheet, (b) drawing the polymeric sheet through a first series of rollers, the first series of rollers acting to set physical characteristics of the polymeric sheet, (c) coating at least one side of the polymeric sheet with silicone, (d) drawing the coated polymeric sheet through a second series of rollers, (e) winding the polymeric sheet onto a spool, and (f) implementing a static neutralization method at steps (d) and (e) to prevent an electrostatic charge accumulation of greater than 3000 volts across the polymeric sheet by neutralizing any charge accumulation occurring at contact between the coated polymeric sheet and the second series of rollers and between the coated polymeric sheet and the spool.

* * * * *